(12) United States Patent
Ikeda

(10) Patent No.: US 7,945,046 B2
(45) Date of Patent: May 17, 2011

(54) DECRYPTION PROCESSING APPARATUS, DECRYPTION METHOD AND IMAGE FORMING APPARATUS

(75) Inventor: Kazunori Ikeda, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1373 days.

(21) Appl. No.: 11/372,336

(22) Filed: Mar. 9, 2006

(65) Prior Publication Data

US 2007/0192624 A1  Aug. 16, 2007

(30) Foreign Application Priority Data

Oct. 31, 2005 (JP) ................... 2005-316969

(51) Int. Cl.
*H04N 7/167* (2006.01)

(52) U.S. Cl. ........ 380/200; 380/235; 380/239; 380/240; 705/50; 705/51; 713/189; 713/193

(58) Field of Classification Search .................. 380/239, 380/201, 46, 200; 713/189, 190, 193; 705/50, 705/51
See application file for complete search history.

(56) References Cited

U.S. PATENT DOCUMENTS

| | | | |
|---|---|---|---|
| 7,082,198 B1 * | 7/2006 | Ishii .............................. | 380/239 |
| 7,496,767 B2 | 2/2009 | Evans | |
| 2003/0190044 A1 * | 10/2003 | Higashi et al. ................. | 380/201 |
| 2004/0170274 A1 * | 9/2004 | Machida et al. ................ | 380/46 |

FOREIGN PATENT DOCUMENTS

| | | |
|---|---|---|
| JP | 2002-278844 A | 9/2002 |
| JP | 2003-032248 A | 1/2003 |
| JP | 2003-348071 A | 12/2003 |

OTHER PUBLICATIONS

Japanese Office Action dated May 7, 2009 (5 pages), and English translation thereof (5 pages), issued in counterpart Japanese Application Serial No. 2005-316969.

* cited by examiner

*Primary Examiner* — Taghi T. Arani
*Assistant Examiner* — Jason Lee
(74) *Attorney, Agent, or Firm* — Holtz, Holtz, Goodman & Chick, PC

(57) ABSTRACT

There is described a decryption processing apparatus and an image forming apparatus, which make it possible to prevent the encrypted data from being incorrectly decrypted by employing a wrong decryption key. The decryption processing apparatus for decrypting encrypted digital data including encrypted code and encrypted data, includes: a first decryption section to generate decrypted diagnosis code by decrypting the encrypted code; a second decryption section to decrypt the encrypted data; a determination section to determine based on the diagnosis code whether a decryption process of the encrypted code is normally executed; and a control section to allow starting decryption process of the encrypted data by the second decryption section when the decryption process of the encrypted code is normal, and to prohibit starting the decryption process of the encrypted data by the second decryption section when the decryption process of the encrypted code is abnormal.

5 Claims, 3 Drawing Sheets

DECRYPTION PROCESSING APPARATUS, DECRYPTION METHOD AND IMAGE FORMING APPARATUS

RELATED APPLICATION

This application is based on Japanese Patent Application NO. 2005-316969 filed on Oct. 31, 2005 in Japanese Patent Office, the entire content of which is hereby incorporated by reference.

BACKGROUND

1. Field of the Invention

The present invention relates to a decryption processing apparatus for applying the decrypting process to encrypted data and a decryption method and the like, and particularly the invention relates to a technology for preventing the decryption process in advance when the encrypted data is not correctly decrypted.

2. Description of the Related Art

Recently, there has been used an encryption technology for preventing leakage and abuse of data. The encrypted data can be restored when decrypted using the correct decryption key and decryption algorithm, but the data is not correctly restored when decrypted using the wrong decryption key and algorithm.

As a method for determining whether the encrypted data is correctly restored, there is a method that directly checks the decrypted data, but it is less efficient when checking a large amount of data. Thus, there has been proposed a method that encrypts the decryption verification code and the original data at the same time, checks the decryption verification code after decrypting them to determine whether the decryption process is normally executed (for example, see Patent Document 1).

[Patent Document]
Tokkai 2003-32248 (Japanese Non-Examined Patent Publication)

The method disclosed in the above Patent Document 1 verifies whether the decryption is correctly done by the decryption verification code after decrypting both of the encrypted decryption verification code and the original data. Thus, the decryption process is executed to the entire encrypted data also in the case where the decryption is not correctly done, so that the process load is large.

Further, when the decryption is not correctly done, data that is not correctly restored is generated. Even though the wrong data is generated as described above, the data is not normally operates when it is a program, and the abuse of data does not occur. Also, in the case of image data of a specific file format in which the data is seen through a browsing application, the data that is not correctly restored cannot be browsed because the data does not conform to the rule the application defines. Thus, even though the data that is not correctly decrypted is generated, this hardly causes the leakage and abuse of information.

However, when the encrypted data which is image data of bitmap type and the like is not correctly decrypted due to the use of a wrong decryption key, there is a high possibility that what contents the original image has is guessed from the image that is not correctly decrypted, because of the nature of the data. Also, there is a possibility that the original image is guessed with high accuracy from even the abnormal image that is not correctly decrypted, as the decryption and image output are repeated several times by changing the decryption key and some sort of regularity (such as the decryption rule of image data due to the change in the decryption key) is found.

Further, the image that is not correctly decrypted is generated on a memory from which the information leakage may occur, although the image is not formed on a recording paper or other materials.

SUMMARY

To overcome the abovementioned drawbacks in conventional decryption processing apparatus and image forming apparatus, it is an object of the present invention to provide a decryption processing apparatus, an image forming apparatus and a decrypting method, which make it possible to prevent the encrypted data from being incorrectly decrypted by employing a wrong decryption key.

The decryption processing apparatus for decrypting encrypted digital data including encrypted code and encrypted data, comprises a first decryption section to generate decrypted diagnosis code by decrypting the encrypted code; a second decryption section to decrypt the encrypted data; a determination section to determine based on the diagnosis code whether a decryption process of the encrypted code is normally executed; and a control section to allow starting decryption process of the encrypted data by the second decryption section when the decryption process of the encrypted code is normal, and to prohibit starting the decryption process of the encrypted data by the second decryption section when the decryption process of the encrypted code is abnormal.

According to another aspect of the present invention, the method for decrypting encrypted digital data including encrypted code and encrypted data, comprising the steps of: generating decrypted diagnosis code by decrypting the encrypted code; determining whether or not a first decryption processing for the encrypted code is normally executed, based on the diagnosis code generated in the generating step; allowing to apply a second decryption processing to the encrypted data included in the encrypted digital data, when determining that the first decryption processing for the encrypted code is normally executed in the determining step; and prohibiting the second decryption processing, to be applied to the encrypted data included in the encrypted digital data, from implementing, when determining that the first decryption processing for the encrypted code is not normally executed in the determining step.

The invention itself, together with further objects and attendant advantages, will best be understood by reference to the following detailed description taken in conjunction with the accompanying drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Hereinafter, the preferred embodiment of the invention will be described based on the accompanying drawings.

Figure 1:
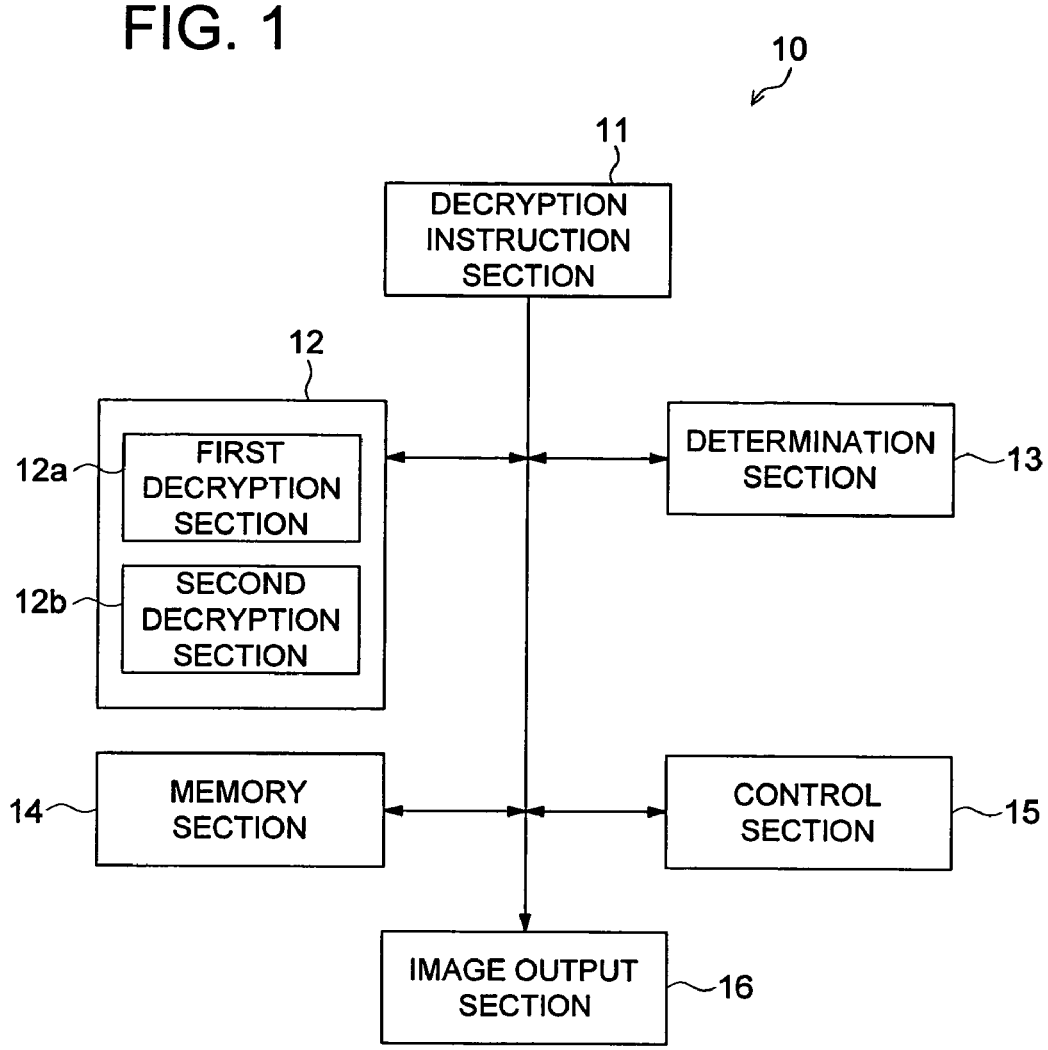
FIG. 1 shows a general configuration of a decryption processing apparatus according to an embodiment of the invention.

FIG. 1 shows the general configuration of a decryption processing apparatus 10 according to an embodiment of the invention. The decryption processing apparatus 10 includes a decryption instruction section 11, a decryption section 12, a determination section 13, a memory section 14, a control section 15 and an image output section 16, wherein these sections are interconnected to each other.

The decryption instruction section 11 includes an operation section and a display section, and various instructions pertaining to the decryption process are input therein. More specifically, it functions as a decryption key input section by inputting an instruction to execute the decryption process and a decryption key used for the decryption process and the like.

The decryption section 12 functions as a first decryption section 12a for generating a decrypted diagnosis code by applying the decryption process to the encrypted code in the encrypted digital data including the encrypted code and encrypted data, and also functions as a second decryption section 12b for applying the decryption process to the encrypted data in the encrypted digital data.

The determination section 13 determines whether the decryption process of the encrypted code is normally executed by the first decryption section 12a, based on the decrypted diagnosis code generated by applying the decryption process to the encrypted code in the encrypted digital data by the first decryption section 12a.

The memory section 14 is a memory for storing the encrypted digital data to be decrypted. The encrypted digital data is input from an input section not shown.

The control section 15 functions to integrally control the action of the decryption processing apparatus 10, and the control section 15 is configured with a CPU (Central Processing Unit), a flash memory, a RAM (Random Access Memory) and the other related components as the main part. The control section 15 functions to allow starting the decryption process of the encrypted data by the second decryption section 12b when it is determined by the determination section 13 that the decryption process of the encrypted code is normally executed, while the control section 15 functions to prohibit starting the decryption process of the encrypted data by the second decryption section 12b when it is determined by the determination section 13 that the decryption process of the encrypted code is not normally executed.

The image output section 16 functions to output the data obtained by decrypting the encrypted data by the decryption section 12b to outside. Herein, the encrypted data is data of which the image data is encrypted. The image output section 16 serves as a print function for forming and outputting an image onto a recording paper based on the image data obtained by decrypting the encrypted data. Thus, the decryption processing apparatus 10 is configured to function as an image forming apparatus. Incidentally, the output of the data obtained by decrypting the encrypted data may be an output to the display section, or a transmission to an external terminal by Email or facsimile and the like.

Figure 2:
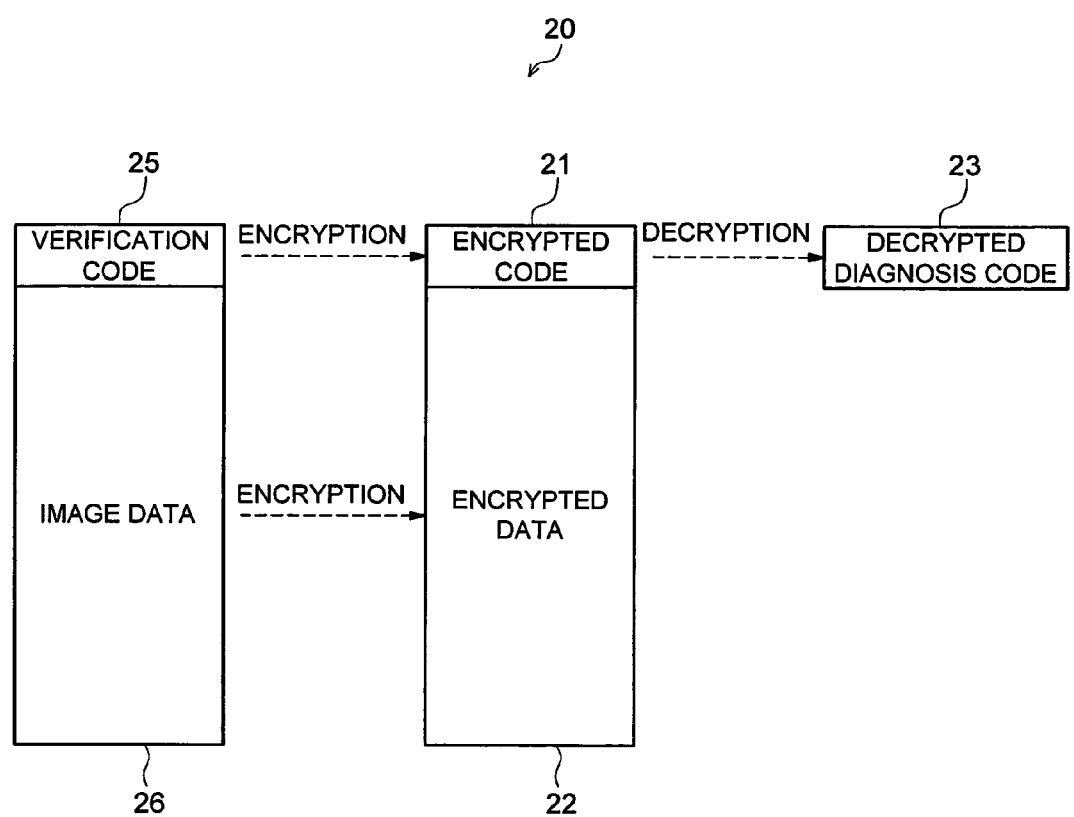
FIG. 2 shows a relationship between the encrypted digital data, the pre-encrypted data, and the decrypted diagnosis code.

FIG. 2 shows the relation between the encrypted digital data, the pre-encrypted data, and the decrypted diagnosis code. Encrypted digital data 20 is configured with encrypted code 21 and encrypted data 22. The encrypted code 21 is obtained by encrypting verification code 25. The verification code 25 is code data for verifying whether the decryption process by the input decryption key is normally executed. The encrypted data 22 is data that makes up a main part of the encrypted digital data 20. Herein, the encrypted data 22 is obtained by encrypting image data 26. Further, it is assumed that the encrypted code 21 and the encrypted data 22 are encrypted by the same encryption method and the same encryption key. The encryption method may be a secret key method in which the encryption key and the decryption key are identical, or may be a public key method in which the encryption key and the decryption key are different.

In order to treat the encrypted digital data 20 as a file, the encrypted code 21 is included in a header part of the file and the encrypted data 22 is made as a main part of the file. The decrypted diagnosis code 23 is a code generated by applying the decryption process to the encrypted code 21 in the encrypted digital data 20 by the first decryption section 12a. The decrypted diagnosis code 23 is identical to the verification code 25 when the encrypted code 21 is correctly decrypted, and the decrypted diagnosis code 23 is not identical to the verification code 25 when the encrypted code 21 is not correctly decrypted. In other words, it can be determined whether the decryption key is correct or not based on whether the decrypted diagnosis code 23 obtained by applying the decryption process to the encrypted code 21 by the input decryption key is identical to the verification code 25.

Incidentally, the encryption is generally done by separating the data to be encrypted into blocks of a given size (hereinafter, referred to as plain blocks) and by shuffling the bits in each of the plain blocks. Thus, the data in which the values of the adjacent bits are the same is not preferable for the verification code 25. For example, in order to make the verification code 25 the eight-bit data, it should avoid the use of the data in which each of the bits has the same value such as "11111111" or "00000000" to the verification code 25, because such data is not changed when shuffled.

Figure 3:
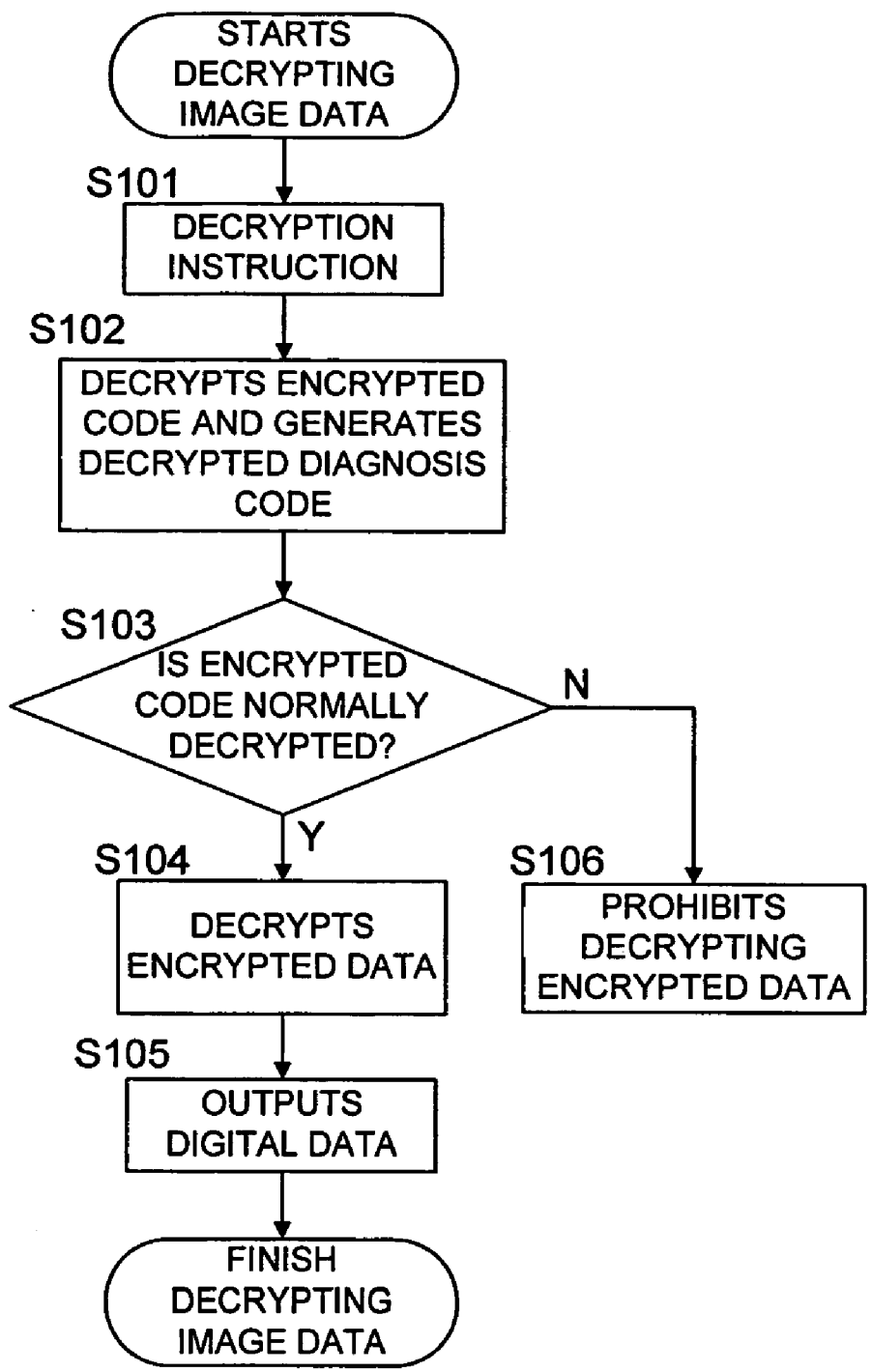
FIG. 3 shows a flowchart of a decryption processing conducted by a decryption processing apparatus embodied in the present invention.

Next, the flow of the decryption action in the decryption processing apparatus 10 will be described based on FIG. 3.

It is assumed herein that the encrypted digital data 20 to be decrypted is stored in the memory section 14. First, the decryption instruction and decryption key to the encrypted digital data 20 that is present in the memory section 14 are input by a user (Step S101). This instruction may be made through a touch panel type user interface not shown that the apparatus 10 has, or through a general-purpose PC (Personal Computer) via a LAN (Local Area Network). Further, when the apparatus 10 has a general purpose I/F (Interface), for example, a USB (Universal Serial Bus) I/F or parallel I/F, the instruction may be made using the I/F from an external device.

The control section 15, when receiving the decryption instruction through the decryption instruction section 11, inputs the decryption key that has been input together with the decryption instruction, and the encrypted code in the encrypted digital data that is stored in the memory section 14, to the first decryption section 12a. Because of this feature, the first decryption section 12a executes the decryption process of the encrypted code using this decryption key, and generates the decrypted diagnosis code (Step S102).

The generated decrypted diagnosis code is input to the determination section 13, in which it is determined whether the decryption process of the encrypted code is normally executed (Step S103).

The determination section 13 compares the input decrypted diagnosis code to the given verification code. For example, the verification code may be previously stored in the memory section 14, or otherwise input by a user. Herein, the decryption key that has been input together with the decryption instruction is used as the verification code. Incidentally, what is to be the verification code that will be compared to the decrypted diagnosis code is depending on how to generate the encrypted code. Different types of variations on the verification code and the decrypted diagnosis code will be described below.

The determination section 13 determines that the decryption process of the encrypted code by the first decryption section 12a is normally executed when the decrypted diagnosis code and the verification code are identical, and the determination section 13 determines that the decryption process of the encrypted code by the first decryption section 12a is not normally executed when they are not identical.

When it is determined by the determination section 13 that the decryption process of the encrypted code is normally executed (Step S103; Y), the control section 15 allows starting the decryption process of the encrypted data stored in the memory section 14 by the second decryption section 12b (Step S104). Thus, the second decryption section 12b executes the decryption process of the encrypted data, and temporarily stores the decrypted data in the memory section 14. This decrypted data is subsequently output from the image output section 16 (Step S105).

On the other hand, when it is determined by the determination section 13 that the decryption process of the encrypted code is not normally executed (Step S103; N), the control section 15 prohibits starting the decryption process of the encrypted data stored in the memory section 14 (Step S106). Thus, the encrypted data is not decrypted by the wrong decryption key.

As described above, the decryption processing apparatus first applies the decryption process only to the encrypted code, allows starting the decryption process of the encrypted data when the decryption process of the encrypted code is normal, while prohibits starting the decryption process of the encrypted data when it is abnormal. Thus, the encrypted data is not decrypted by the wrong decryption key, which prevents the information leakage as the original data is guessed from the abnormal data generated without being normally decrypted.

Next, different aspects pertaining to the decrypted diagnosis code and the verification code will be described.

First Example

In the first example, it is assumed that the encryption method is the secret key method, where the encryption key is equal to the decryption key. In this case, it is assumed that the verification code is equal to the encryption key. The encrypted code is generated by encrypting the verification code by this encryption key, as well as the encrypted data is generated by encrypting the digital data such as image data by the same encryption key. The encrypted digital data made up of a pair of the encrypted code and the encrypted data is stored in the memory section 14.

In the first example, as the secret key method is employed, the verification code is equal to the decryption key. In other words, when the decryption key the user inputs is correct, the decrypted diagnosis code obtained by applying the decryption process to the encrypted code by this decryption key and the decryption key (verification code) are identical. Thereby, in the first example, there is no need to store the verification code inside the decryption processing apparatus 10 or to otherwise obtain the verification code from outside, so that the decryption key that the user inputs from the decryption instruction section 11 can be used as the verification code.

Further, in order to improve security, the verification code is set equal to the encryption key plus arbitrary code. The arbitrary code may be set by the user in encryption, or may be set by the decryption processing apparatus 10. For example, in the case where the arbitrary code is set by the user in encryption, the method of obtaining the arbitrary code in decryption is to allow the user to input the arbitrary code together with the decryption key also in decryption.

In the case where the arbitrary code is set by the decryption processing apparatus 10 in encryption, the apparatus may let the user know the arbitrary code in encryption and ask the user to input the arbitrary code when receiving the decryption instruction from the user. It is also possible that the decryption processing apparatus 10 stores the arbitrary code the apparatus sets, in the memory section 14, by associating with the encrypted code and the like, and reads the corresponding arbitrary code from the memory section 14 to use.

Second Example

In the second example, it is assumed that the encryption method is the secret key method, and that the encryption key and the decryption key are different. In this case, it is assumed that the verification code is equal to the decryption key. The encrypted code is generated by encrypting the verification code by the encryption key which makes up a pair with this decryption key, as well as the encrypted data is generated by encrypting the digital data such as image data by the same encryption key. The encrypted digital data made up of a pair of the encrypted code and the encrypted data is stored in the memory section 14.

In the second example, the verification code is equal to the decryption key. In other words, when the decryption key that the user inputs is correct, the decrypted diagnosis code obtained by decrypting the encrypted code by the decryption key and the decryption key (verification code) are identical. Thereby, in the second example, there is no need to store the verification code inside the decryption processing apparatus 10 or to otherwise obtain from outside, so that the decryption key that the user inputs from the decryption instruction section 11 can be used as the verification code.

Further, in order to improve security, the verification code is set equal to the encryption key plus arbitrary code. The methods of setting the arbitrary code and inputting the arbitrary code in decryption are the same in the first example, and the description thereof will be omitted.

Third Example

In the third example, it is assumed that the verification code is equal to the arbitrary code. In other words, the user or the decryption processing apparatus 10 sets in encryption the arbitrary code used as the verification code. Desirably, this arbitrary code is set in view of the characteristics of the different encryption methods. Further, desirably the arbitrary code used as the verification code is a multiple of the plain block length (for example, the plain block length is 128 bits when the encryption method is AES (Advanced Encryption Standard)).

In the third example, for example, in the case where the arbitrary code is set by the user in encryption, the method of obtaining the arbitrary code in decryption is to allow the user to input the arbitrary code together with the decryption key also in decryption. In the case where the arbitrary code is set by the decryption processing apparatus 10 in encryption, the apparatus may let the user know the arbitrary code in encryption and ask the user to input the arbitrary code when the user issues the decryption instruction. Further, it is also possible that the decryption processing apparatus 10 stores the arbitrary code that the apparatus sets, in the memory section 14, by associating with the encrypted code and the like, and reads the corresponding arbitrary code from the memory section 14 to use.

Fourth Example

In the fourth example, the encryption method used for generating the encrypted code is differentiated from the encryption method used for generating the encrypted data. The verification code may be set by any method of the first to third examples. The user may be allowed to input, when decrypting, together with the decryption instruction, the instruction of the encryption method to the encrypted code, the instruction of the encryption method to the encrypted data, the decryption key to the encrypted code, and the decryption key to the encrypted data, from the decryption instruction section. Incidentally, there is another method that stores the decryption key in the memory section 14 of the decryption processing apparatus 10 in advance.

Fifth Example

In the fifth example, the decryption key to the encrypted code is differentiated from the decryption key to the encrypted data. It may be configured that the user is allowed to input both of the first decryption key to the encrypted code and the second decryption key to the encrypted data, or that the user is allowed to input only the first decryption key, and only in the case where the encrypted code is normally decrypted by the first decryption key, the encrypted data is decrypted by the second decryption key the apparatus manages therein. Incidentally, not only the decryption key, but also the encryption method may be further differentiated between the encrypted code and encrypted data. In this case, the method may be set in such a manner that the first encryption method is fixed for the encrypted code and the second encryption method is fixed for the encrypted data respectively, or that the methods can be changed accordingly.

Having described the embodiment of the invention with reference to the accompanying drawings, it is to be understood that the specific configurations are not limited to those shown in the embodiment, and that the various changes and additions could be included therein without departing from the spirit of the invention.

For example, the embodiment has been described taking an example of the case where the encrypted digital data is already stored in the memory section 14. However, the decryption processing apparatus 10 may be provided with an input section of the encrypted digital data. The encrypted digital data may be input to the input section from the external terminal, or the input section may be provided therein with an encryption section to generate the encrypted digital data by encrypting the verification data and the digital data. At this time, the digital data to be the base of the encrypted data can be obtained as image data, for example, from a document reader or a developing section for developing print data into a raster image, when the apparatus is configured as a digital multifunctional machine or other machines.

According to the invention, the advantages described below can be achieved.

With the decryption processing apparatus, decryption method and image forming apparatus according to the invention, because it is configured to first apply the decryption process to the encrypted code of the encrypted digital data including the encrypted code and the encrypted data, allow starting the decryption process of the encrypted data when the decryption of the encrypted code is normal, while prohibit starting the decryption process of the encrypted data when the decryption of the encrypted code is not normal, the encrypted data is not decrypted by the wrong decryption key, which prevents the information leakage as the original data is guessed from the abnormal data generated without being decrypted correctly.

Further, the decryption process of the encrypted data is prohibited when the encrypted data cannot be correctly decrypted, so that an unnecessary decryption process is prevented and the process load is reduced, which contributes to improve the processing speed in the other necessary description processes and in the entire system.

While the preferred embodiments of the present invention have been described using specific term, such description is for illustrative purpose only, and it is to be understood that changes and variations may be made without departing from the spirit and scope of the appended claims.

What is claimed is:

1. A decryption processing apparatus that decrypts encrypted digital data including an encrypted code and encrypted image data, the decryption processing apparatus comprising:
    a first decrypting section to apply a first decryption processing to the encrypted code so as to create a decryption diagnosis code from the encrypted code;
    a second decrypting section to apply a second decryption processing to the encrypted image data so as to generate decrypted image data from the encrypted image data;
    a decryption-processing determining section to determine whether or not the first decryption processing is normally achieved, based on the decryption diagnosis code created by the first decrypting section; and
    a control section comprising a CPU to control the second decrypting section, based on a result determined by the decryption-processing determining section;
    wherein (i) when the decryption-processing determining section determines that the first decryption processing is normally achieved, the control section allows the second decrypting section to commence an operation for applying the second decryption processing to the encrypted image data, and (ii) when the decryption-processing determining section determines that the first decryption processing is not normally achieved, the control section prohibits the second decrypting section from commencing the operation for applying the second decryption processing to the encrypted image data;
    wherein the encrypted code is acquired by encrypting a verification code, which serves as a decryption key for decoding the encrypted digital data; and
    wherein the decryption-processing determining section determines that the first decryption processing is normally achieved when a first decryption key, which was employed for the first decryption processing applied to the encrypted code by the first decrypting section, coincides with the decryption diagnosis code created by applying the first decryption processing.

2. The decryption processing apparatus of claim 1, further comprising:
    a decryption-key inputting section to input a first decryption key that is employed for the first decryption processing to be applied to the encrypted code by the first decrypting section.

3. The decryption processing apparatus of claim 1, wherein a first decryption key, which was employed for the first decryption processing applied to the encrypted code by the first decrypting section, is same as a second decryption key, which is employed for the second decryption processing to be applied to the encrypted image data by the second decrypting section.

4. An image forming apparatus, which decrypts encrypted digital data, including an encrypted code and encrypted image data, so as to generate decrypted image data from the encrypted image data, and forms an image based on the decrypted image data, comprising:
- a first decrypting section to apply a first decryption processing to the encrypted code so as to create a decryption diagnosis code from the encrypted code;
- a second decrypting section to apply a second decryption processing to the encrypted image data so as to generate the decrypted image data from the encrypted image data;
- a decryption-processing determining section to determine whether or not the first decryption processing is normally achieved, based on the decryption diagnosis code created by the first decrypting section;
- a control section comprising a CPU to control the second decrypting section, based on a result determined by the decryption-processing determining section; and
- an image forming section to form the image based on the decrypted image data;
- wherein (i) when the decryption-processing determining section determines that the first decryption processing is normally achieved, the control section allows the second decrypting section to commence an operation for applying the second decryption processing to the encrypted image data, and (ii) when the decryption-processing determining section determines that the first decryption processing is not normally achieved, the control section prohibits the second decrypting section from commencing the operation for applying the second decryption processing to the encrypted image data;
- wherein the encrypted code is acquired by encrypting a verification code, which serves as a decryption key for decoding the encrypted digital data; and
- wherein the decryption-processing determining section determines that the first decryption processing is normally achieved when a first decryption key, which was employed for the first decryption processing applied to the encrypted code by the first decrypting section, coincides with the decryption diagnosis code created by applying the first decryption processing.

5. A method for decrypting encrypted digital data including an encrypted code and encrypted image data, the method being implemented by a CPU of a decryption processing apparatus and comprising:
- applying a first decryption processing to the encrypted code so as to create a decryption diagnosis code from the encrypted code;
- determining whether or not the first decryption processing is normally achieved, based on the decryption diagnosis code created by the first decrypting section; and
- allowing commencement of an operation for applying a second decryption processing to the encrypted image data so as to generate decrypted image data from the encrypted image data, when it is determined that the first decryption processing is normally achieved, and prohibiting the commencement of the operation for applying the second decryption processing to the encrypted image data, when it is determined that the first decryption processing is not normally achieved;
- wherein the encrypted code is acquired by encrypting a verification code, which serves as a decryption key for decoding the encrypted digital data; and
- wherein it is determined that the first decryption processing is normally achieved when a first decryption key, which was employed for the first decryption processing applied to the encrypted code, coincides with the decryption diagnosis code created by applying the first decryption processing.

* * * * *